(12) United States Patent
Somerkoski

(10) Patent No.: US 7,119,303 B2
(45) Date of Patent: Oct. 10, 2006

(54) WELDING CURRENT NOZZLE MATERIAL

(75) Inventor: Jukka Somerkoski, Vanha-Ulvila (FI)

(73) Assignee: Luvata Oy, (FI)

( * ) Notice: Subject to any disclaimer, the term of this patent is extended or adjusted under 35 U.S.C. 154(b) by 15 days.

(21) Appl. No.: 10/497,835

(22) PCT Filed: Dec. 3, 2002

(86) PCT No.: PCT/FI02/00974

§ 371 (c)(1),
(2), (4) Date: Jun. 7, 2004

(87) PCT Pub. No.: WO03/055633

PCT Pub. Date: Jul. 10, 2003

(65) Prior Publication Data

US 2005/0127055 A1 Jun. 16, 2005

(30) Foreign Application Priority Data

Dec. 13, 2001 (FI) .................................. 20012452

(51) Int. Cl.
*B23K 9/28* (2006.01)

(52) U.S. Cl. ................................................. 219/137.61
(58) Field of Classification Search ............ 219/137.61
See application file for complete search history.

(56) References Cited

U.S. PATENT DOCUMENTS 5,340,658 A * 8/1994 Komatsu et al. ............ 428/558

FOREIGN PATENT DOCUMENTS

| EP | 2 565 141 | 5/1984 |
| EP | 0 324 088 | 7/1989 |
| EP | 0 865 859 | 10/1995 |
| JP | 5-277742 | 10/1993 |
| JP | 10-230362 | 2/1998 |
| JP | 10-130751 | 5/1998 |

* cited by examiner

*Primary Examiner*—Len Tran
(74) *Attorney, Agent, or Firm*—Morgan & Finnegan, LLP

(57) ABSTRACT

The invention relates to a welding current nozzle material used in the welding current nozzle for feeding filler material in MIG-type welding. The material used in the welding current nozzle according to the invention is a copper-based alloy where silver is alloyed.

5 Claims, 2 Drawing Sheets

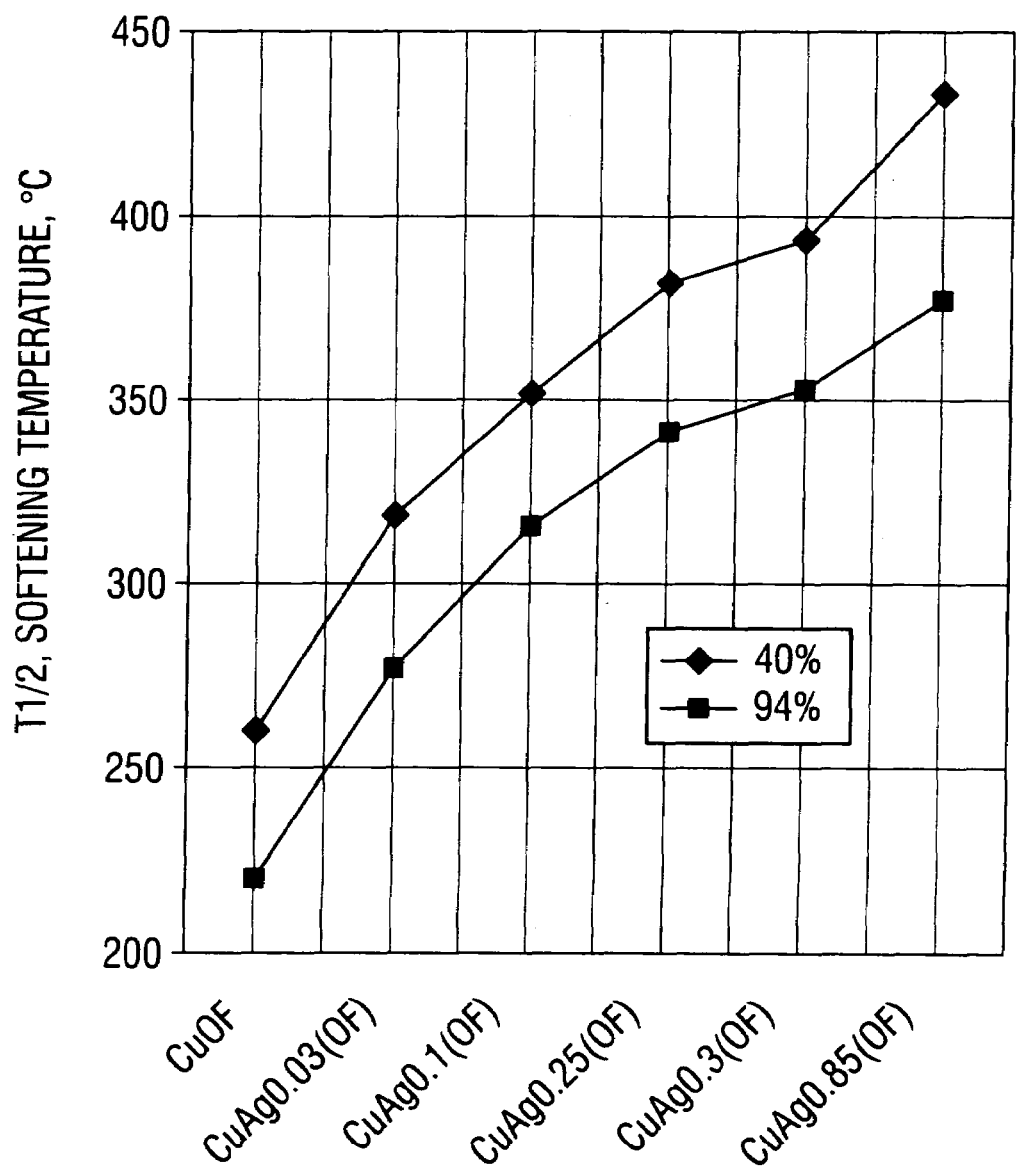

WELDING CURRENT NOZZLE MATERIAL

Figure 1:
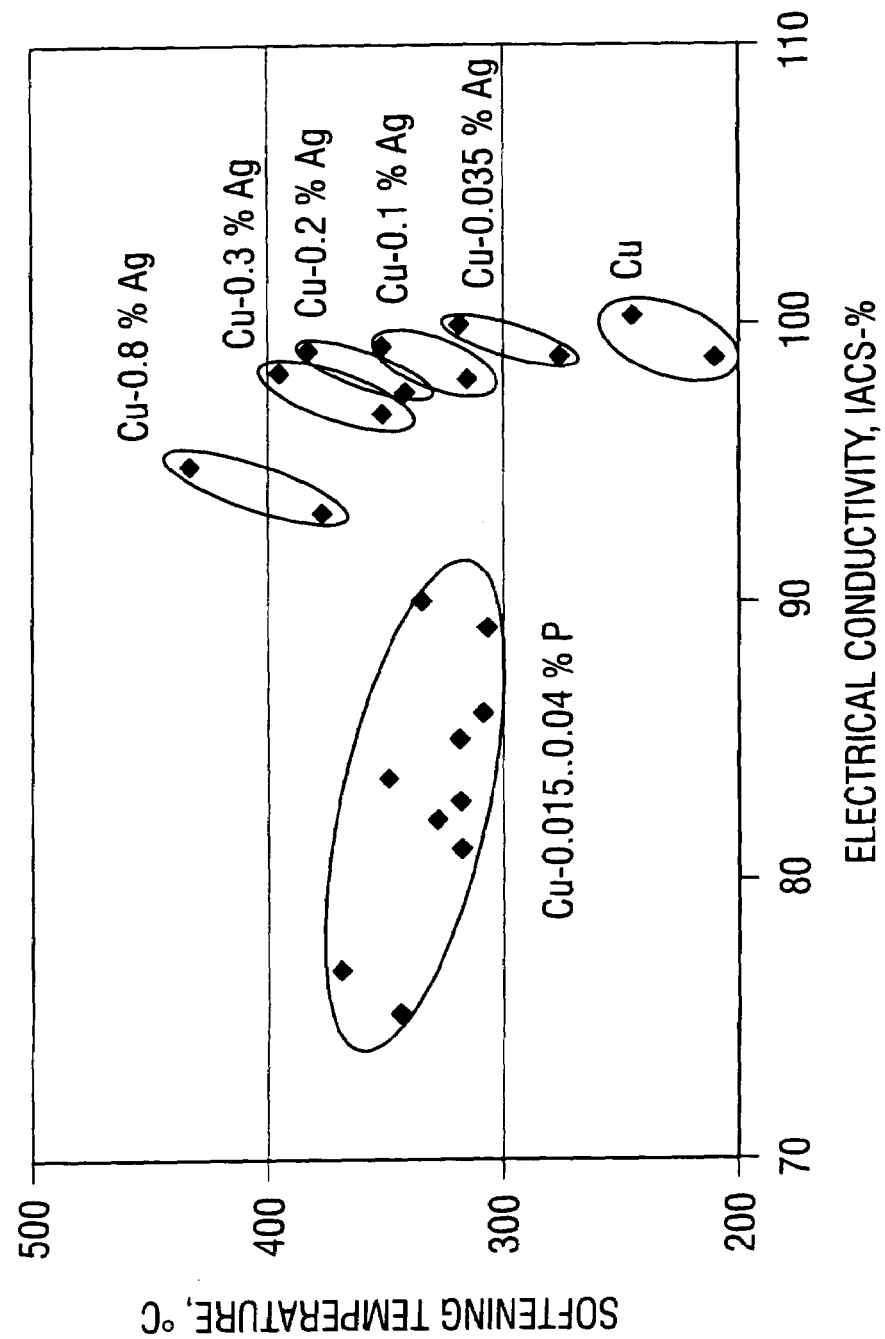

The present invention relates to a welding current nozzle material used in MIG-type welding as the welding current nozzle required for feeding the filler material.

In MIG-type welding, the heat source is a direct current arc created between the object to be welded and the filler wire used in the welding process. The filler wire is fed automatically from a wire spool to the electric arc, and usually the filler wire serves as the positive pole. Owing to the electric arc, on the surface of the object to be welded, there is created a molten weld pool consisting of the material of the object to be welded and the filler material. In order to prevent the molten weld pool from being oxidized before it is solidified, shielding gas is conducted around the filler wire supply by means of a separate gas nozzle. Generally the shielding gas is argon, but also a mixture of argon and helium can be used as the shielding gas.

In order to conduct electric current to the filler wire used in MIG-type welding, around the filler wire entering the welding process, and simultaneously inside the shielding gas nozzle, there is installed a contact tube that serves as the welding current nozzle. As regards the material of the welding current nozzle, there is required good electrical conductivity, good wearing resistance particularly in the inner wall of the contact tube and a high softening temperature. In practice, the required properties must be optimized for instance from the point of view of production and economy. Usually the welding current nozzle is made for instance of zirconium copper, chromium copper, highly phosphorous copper and also unalloyed copper. Said materials are as such good materials for a welding current nozzle, but one of their drawbacks relates to the smoothness of the production process.

The object of the present invention is to eliminate some of the drawbacks of the prior art and to realize an improved material for a welding current nozzle to be used in MIG-type welding, said material being essentially easy to manufacture and having essentially different properties than the materials used in the prior art. The essential novel features of the invention are enlisted in the appended claims.

According to the invention, the material to be used in MIG-type welding, advantageously in the welding current nozzle required for feeding filler material inside the gas flow nozzle, consists essentially of a copper-based alloy, alloyed with silver in order to raise the softening temperature thereof. When necessary, in the material according to the invention there can also be alloyed small amounts of other agents for raising the softening temperature of the material, such as magnesium. In addition, the material according to the invention may contain other ingredients, classified as impurities, such as phospor and iron. The silver content in the copper-silver alloy according to the invention is within the range 0.002–5% by weight, advantageously 0.03–1% by weight. In case magnesium is used as an alloy agent, the magnesium content may vary within the range >0 to 0.03% by weight. The alloy according to the invention is advantageously manufactured by casting, by an upwardly proceeding vertical casting method, and the obtained casting billet is worked by drawing or extrusion to the desired measure and shape. For example, the desired inner diameter of the welding current nozzle depends on the shape and thickness of the filler material conducted through the welding current nozzle.

The welding current nozzle, made of the material according to the invention, required for feeding filler material in MIG-type welding is advantageously installed inside the gas nozzle that feeds shielding gas around the spot to be welded. Inside the welding current nozzle, there is made a channel along which the filler material used in MIG-type welding is conducted through the welding current nozzle. At least at one point, advantageously at the end located nearest to the spot to be welded, the diameter of the channel is designed to be such that the welding current nozzle and the filler material get into a mechanical contact with each other. On the other hand, direct current is conducted to the welding current nozzle, and owing to said electric current, a direct current arc is created between the welding current nozzle and the object to be welded. Due to the electric arc, both the filler material proceeding through the welding current nozzle and getting into mechanical contact with the nozzle, and part of the object or objects to be welded are melted, and there is created a molten weld pool surrounded by shielding gas. As the molten weld pool is solidified, there is created a weld joint in the spot to be welded.

The welding current nozzle that is made of the copper-silver alloy according to the invention and used for feeding filler material must, particularly at the end located nearest to the spot to be welded, on its inner surface resist mechanical wearing caused by the filler material. In addition, the welding current nozzle must, particularly at the end located nearest to the spot to be welded, on its outer surface resist the high temperature differences caused by the electric arc between the welding current nozzle and the object to be welded, as well as the additional heat caused by the molten weld pool formed of the filler material and the object to be welded.

Owing to the silver contained in the copper-silver alloy according to the invention, the softening temperature of the alloy is essentially raised in comparison with the materials used in the prior art, which as such is advantageous when using said alloy as the welding current nozzle for feeding the filler material in MIG-type welding. Thus the effect of the hot molten weld pool, created in the vinicity of the welding current nozzle, in the nozzle properties is slighter, because the possibility of internal deformations of the welding current nozzle, for instance grain accretions, is decreased. Moreover, the hot molten weld pool cannot affect the external deformation of the welding current nozzle, and neither in the creation of a contact for example between the filler material and the nozzle, which as such essentially extends the working life of the welding current nozzle.

The invention is described in more detail below with reference the appended drawings, where FIG. 1 illustrates a copper-silver alloy according to the invention with various silver contents in an electrical conductivity—softening temperature coordinate system.

FIG. 2 illustrates the effect of the degree of deformation in the copper-silver alloy according to the invention with varying silver contents.

FIG. 1 illustrates the effect of the copper-silver alloy according to the invention in the softening temperature and electrical conductivity. In FIG. 1, the horizontal axis is the electrical conductivity, its unit being the IACS percentage, and the vertical axis is the softening temperature in degrees of Centigrade, ° C. According to FIG. 1, when silver is added in the copper-silver alloy according to the invention, the softening temperature of the alloy is essentially raised; already a silver addition of 0.8% by weight (Cu-0.8% Ag) at best doubles the the softening temperature in comparison with the unalloyed copper (Cu) illustrated as reference in FIG. 1. However, at the cost of the softening temperature, the electrical conductivity is somewhat decreased, but the change in the electrical conductivity is essentially smaller than the change in the softening temperature. Moreover, for the sake of comparison, in FIG. 1 there are illustrated electrical conductivity—softening temperature values with copper alloyed with phospor (Cu-0.015 . . . 0.04% P) used in the prior art. As is apparent from FIG. 1, the values of the copper-silver alloy according to the invention are essentially higher than those of copper alloyed with phospor.

FIG. 2 illustrates the softening temperature as a function of both the silver content of the copper-silver alloy and of the degree of deformation of a casting billet made of said copper-silver alloy. On the vertical axis of FIG. 2, there is illustrated the softening temperature in degrees of Centigrade, ° C., and on the horizontal axis there is illustrated the silver content of the copper-silver alloy according to the invention in percentages by weight, beginning with unalloyed copper (CuOF) (OF=oxygen-free) up to the silver content of 0.85% by weight (CuAg0.85(OF)). In FIG. 2 it is seen that by using a low degree of deformation (40%) in the copper-silver alloy according to the invention, the half-softening temperature is raised essentially higher than with an object having a high degree of deformation (94%). A low degree of deformation is advantageously obtained by casting the copper-silver alloy according to the invention, meant for a welding current nozzle, first by upwardly proceeding vertical casting, whereafter the obtained casting tube billet is drawn to the desired measure.

The invention claimed is:

1. A welding nozzle material for a welding current nozzle used for feeding filler material in MIG-type welding, the material used in the welding current nozzle consisting essentially of a copper-based alloy where silver is alloyed within the range of 0.002–5% by weight and the magnesium content of the copper-based alloy is within the range of >0 to 0.03% by weight.

2. A welding nozzle material according to claim 1, wherein the amount of silver contained in the copper-based alloy is within the range of 0.03–1% by weight.

3. A welding nozzle material according to claim 1, wherein the welding current nozzle material is produced by an upwardly proceeding vertical casting method.

4. A welding nozzle material according to claim 3, wherein in order to realize the welding current nozzle of the welding current nozzle material, the welding current nozzle material billet produced by the vertical casting method is further worked by drawing.

5. A welding nozzle material according to claim 3, wherein in order to realize the welding current nozzle of the welding current nozzle material, the welding current nozzle material billet produced by the vertical casting method is further worked by extrusion.

* * * * *